(12) United States Patent
Jahng

(10) Patent No.: US 10,101,019 B2
(45) Date of Patent: Oct. 16, 2018

(54) PORTABLE DEVICE INCLUDING FLEXIBLE DISPLAY PANEL

(71) Applicant: Jin Woo Jahng, Gwacheon-si (KR)

(72) Inventor: Jin Woo Jahng, Gwacheon-si (KR)

(*) Notice: Subject to any disclaimer, the term of this patent is extended or adjusted under 35 U.S.C. 154(b) by 166 days.

(21) Appl. No.: 15/146,975

(22) Filed: May 5, 2016

(65) Prior Publication Data

US 2017/0013705 A1   Jan. 12, 2017

(30) Foreign Application Priority Data

Jul. 7, 2015 (KR) .......................... 10-2015-0096386

(51) Int. Cl.
| | |
|---|---|
| *F21V 33/00* | (2006.01) |
| *G06F 1/16* | (2006.01) |
| *G09F 9/30* | (2006.01) |
| *H04M 1/02* | (2006.01) |

(52) U.S. Cl.
CPC .......... *F21V 33/0052* (2013.01); *G06F 1/165* (2013.01); *G06F 1/1652* (2013.01); *G09F 9/301* (2013.01); *H04M 1/0268* (2013.01)

(58) Field of Classification Search
CPC ...... G09F 11/18; G09F 11/29; G09F 15/0062; G09F 9/35; G09F 11/02; G09F 9/301; H05K 5/0017; H05K 5/0226; G02F 1/133305; G02F 1/133308; G06F 1/1652; G06F 1/1616; G06F 1/1641; G06F 3/041; G06F 1/163; G06F 1/1643; G06F 1/1626; G06F 1/1635; G06F 1/165; G06F 1/3265; H04M 1/0268; H04M 1/0216; H04M 1/022; H04M 1/0214; H04M 1/02
See application file for complete search history.

(56) References Cited

U.S. PATENT DOCUMENTS

| | | | | |
|---|---|---|---|---|
| 2010/0182288 A1* | 7/2010 | Misawa | ............ | G02F 1/133305 345/204 |
| 2011/0132557 A1* | 6/2011 | Kuroi | ...................... | G03B 21/58 160/368.1 |
| 2013/0234951 A1* | 9/2013 | Kim | ...................... | G06F 1/1652 345/173 |
| 2014/0247544 A1* | 9/2014 | Ryu | ........................ | G09F 11/18 361/679.01 |

FOREIGN PATENT DOCUMENTS

| | | |
|---|---|---|
| KR | 10-2010-0009008 A | 1/2010 |
| KR | 10-2010-0019164 A | 2/2010 |

* cited by examiner

*Primary Examiner* — Thien T Mai
(74) *Attorney, Agent, or Firm* — Rabin & Berdo, P.C.

(57) ABSTRACT

The present invention relates to a portable device including a flexible display panel and having a new structure in which the flexible display panel is easily accepted and withdrawn to be used. In the portable device including a flexible display panel according to the present invention, when a support (40) is rotated using a rotation driving unit (100), a display panel (30) is withdrawn from a case (10) or the display panel (30) is accepted into the case (10). Therefore, the flexible display panel (30) is easily accepted and withdrawn to be used and since there is a feature that the flexible display panel (30) is wound in the form of rolled paper and maintained in a compact size when not used, there is an advantage capable of minimizing the overall size of the portable device.

5 Claims, 11 Drawing Sheets

PORTABLE DEVICE INCLUDING FLEXIBLE DISPLAY PANEL

CROSS-REFERENCE TO RELATED APPLICATION

This application claims priority to and the benefit of Korean Patent Application No. 10-2015-0096386, filed on Jul. 7, 2015, the disclosure of which is incorporated herein by reference in its entirety.

BACKGROUND

1. Field of the Invention

The present invention relates to a portable device including a flexible display panel and having a new structure in which the flexible display panel is easily accepted and withdrawn to be used.

2. Discussion of Related Art

Generally, a display panel which displays an image is known as being unbendable, and also, a portable device using the display panel has been developed to have a structure in which the display panel is supported so as not to be bent.

However, recently, a display panel has been developed in a thin sheet shape to be freely bent and wound in the form of the rolled paper and as described in several related art documents such as Korea Unexamined Publication No. 10-2010-0009008 and Korea Unexamined Publication No. 10-2010-0019164, various sorts of portable devices using a flexible display panel have been developed.

However, when such portable devices merely use the flexible display panel as a display, there is a problem in that an advantage of the flexible display panel such as being freely bent or rolled is not fully available.

Therefore, a new method is necessary for solving this problem.

SUMMARY OF THE INVENTION

The present invention provides a portable device including a flexible display panel and having a new structure in which the flexible display panel is easily accepted and withdrawn to be used for solving the problem described above.

The present invention provides a portable device including a case (10) configured to have a tubular shape vertically extending and having a slit (11) which vertically extends formed in one side of the case (10), a winding drum (20) rotatably provided inside the case (10), a display panel (30) configured to have a flexible sheet shape, wound around an outer circumferential surface of the winding drum (20) and configured to extend outside the case (10) through the slit (11), and a support (40) provided on a rear surface of the display panel (30) and configured to support the display panel (30) extending outside the case (10). A trailing end portion of the support (40) is rotatably coupled to a leading end portion of the display panel (30), and in a state in which the display panel (30) is unwound outside the case (10), the support (40) is laterally rotated so that a leading end portion of the support (40) is in close contact with an outer circumferential surface of the case (10) to support the display panel (30).

The portable device may further include a rotation driving unit (100) connected to the support (40) and configured to rotate the support (40). The rotation driving unit (100) may include a driving bar (101) of which a trailing end portion is rotatably coupled to the case (10) and a leading end portion is hinged with a middle portion of the support (40), and a driving motor (102) connected to the trailing end portion of the driving bar (101) to rotatably reciprocate the driving bar (101).

A planar portion (15) may be formed on one side of the case (10) and the portable device may further include an auxiliary display panel (50) provided on the planar portion (15).

The portable device may further include a communication unit (60) provided inside the case (10), and an illumination lamp (70) and a call button (80) respectively provided in upper and lower end portions of the case (10).

A concave portion (12) into which the support (40) is inserted may be formed in one side of the slit (11), and a magnet member (41) and a magnetic body (13) corresponding to each other may be provided inside the leading end portion of the support (40) and the concave portion (12) so that the leading end portion of the support (40) is fixed inside the concave portion (12).

The portable device may further include a support member (14) disposed in an upper or lower end portion of the case (10) to surround an illumination lamp (70) or a call button (80). One end portion of the support member (14) may be hinged with the case (10), and in a state in which the display panel (30) may be withdrawn outside and supported by the support (40), when the support member (14) is rotated to protrude outside the case (10) and the case (10) is placed on a floor, the case (10) may be supported by the support member (14).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
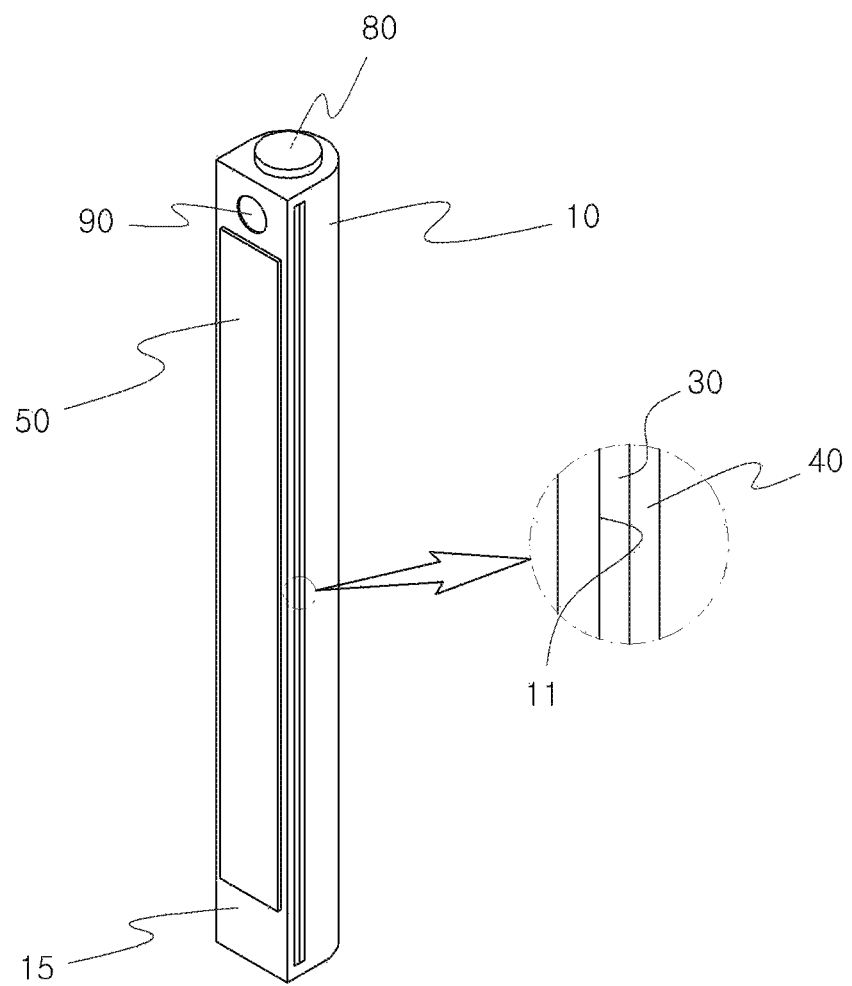
FIG. 1 is a perspective view illustrating a portable device including a flexible display panel according to an embodiment of the present invention.
Figure 2:
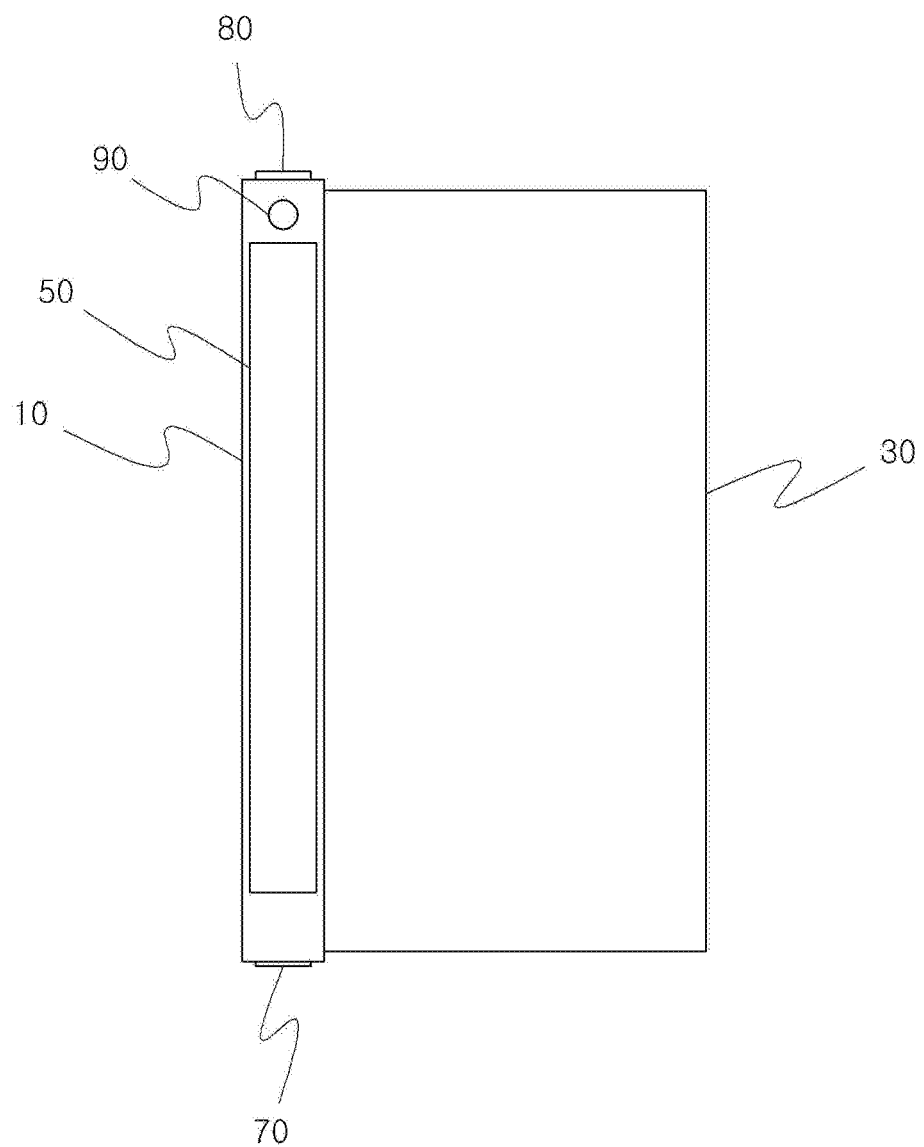
FIG. 2 is a front view illustrating a portable device including a flexible display panel according to an embodiment of the present invention.

Hereinafter, descriptions will be described in detail with a reference to the accompanying drawings.

FIGS. 1 to 6 illustrate a portable device including a flexible display panel according to an embodiment of the present invention. The portable device includes a case 10 provided to have a tubular shape extending vertically, and having a slit 11 extending vertically formed on one side, a winding drum 20 rotatably provided in the case 10, a display panel 30 having a flexible sheet form, winding around an outer circumferential surface of the winding drum 20 and extending to the outside of the case 10 through the slit 11, a support 40 provided on a rear side surface of the display panel 30 to support the display panel 30 extending to outside the case 10, a rotation driving unit 100 connected to the support 40 to rotate the support 40, an auxiliary display panel 50 provided in the case 10, a communication unit 60 provided inside the case 10, and an illumination lamp 70 and a call button 80 which are respectively provided at upper and lower portions of the case 10.

In detail, a planar portion 15 is formed on a front surface of the case 10, the rear side surface of the case 10 is formed in a tubular shape which is semicircular, and the slit 11 is formed in a right side surface of the case 10.

Here, a battery (not shown), and various apparatuses such as an image reproduction unit for reproducing an image are provided inside the case 10.

Figure 4:
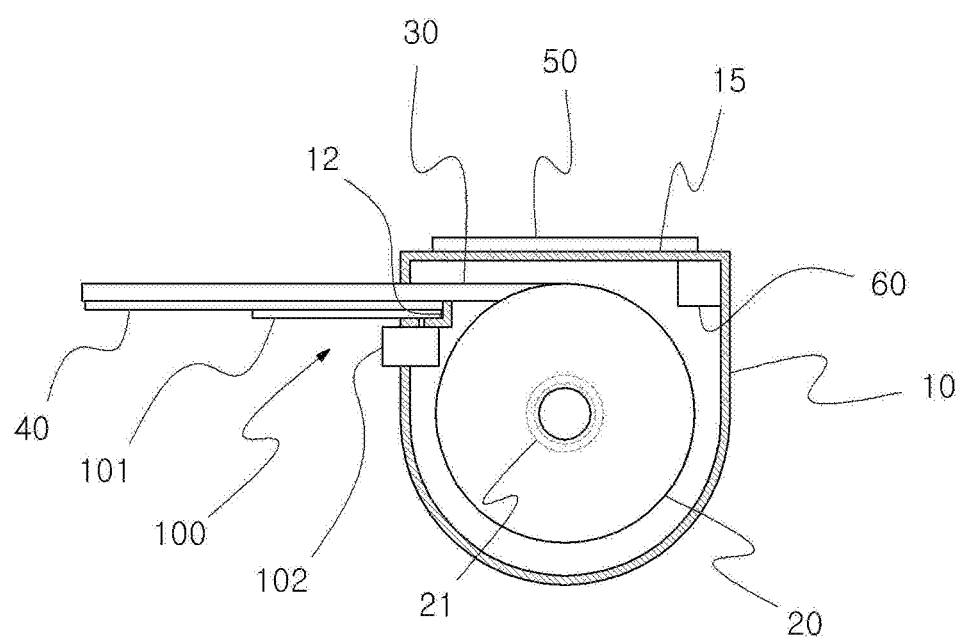
FIG. 4 is a top cross-sectional view illustrating a portable device including a flexible display panel according to an embodiment of the present invention.

As illustrated in FIG. 4, the winding drum 20 is provided in a cylindrical shape vertically extending and rotatably coupled inside the case 10.

The display panel 30 has a trailing end portion fixed to the winding drum 20 and a leading end portion extending to the outside of the case 10 through the slit 11.

Here, a spring 21 is connected to the winding drum 20 and configured to elastically rotate in a direction of winding the display panel 30.

Therefore, when the leading end portion of the display panel 30 is pulled to the outside, the winding drum 20 is rotated so that the display panel 30 is withdrawn from the case 10, and in this case, the spring 21 is compressed.

Further, when the force of pulling the display panel 30 to the outside is released, the winding drum 20 is rotated by the force of the spring 21 to wind the display panel 30 so that the display panel 30 is accepted into the case 10.

Figure 3:
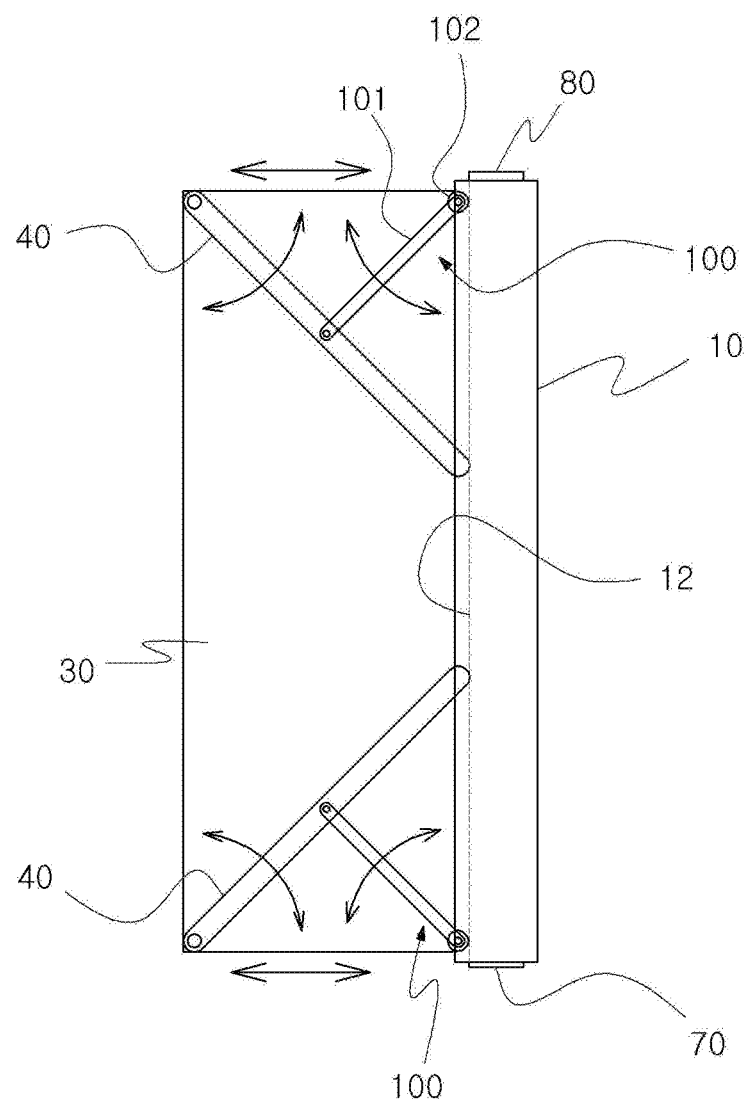
FIG. 3 is a rear view illustrating a portable device including a flexible display panel according to an embodiment of the present invention.

As illustrated in FIG. 3, the support 40 is provided in a bar shape having a large length and a trailing end portion thereof is rotatably coupled to a rear side surface of the display panel 30.

Here, the support 40 is constituted of two supports which are respectively hinged with an upper corner and a lower corner of the leading portion of the rear side surface of the display panel 30 so that the supports can be rotated from a state in which the supports are vertically extended to face each other to being horizontally extended to face the case 10.

Further, a concave portion 12 into which the leading end portion of the support 40 is inserted is formed at one side of the slit 11, and the leading end portion of the support 40 is slidably coupled in a vertical direction.

The rotation driving unit 100 includes a driving bar 101 having a trailing end portion rotatably coupled to the case 10 and a leading end portion hinged with a middle portion of the support 40, and a driving motor 102 connected to the trailing end portion of the driving bar 101 to rotatably reciprocate the driving bar 101.

Accordingly, when the driving motor 102 is reciprocally rotated, the driving bar 101 is rotated to rotate the support 40 horizontally or vertically and thus, the display panel 30 is withdrawn from or accepted into the case 10.

Figure 5:
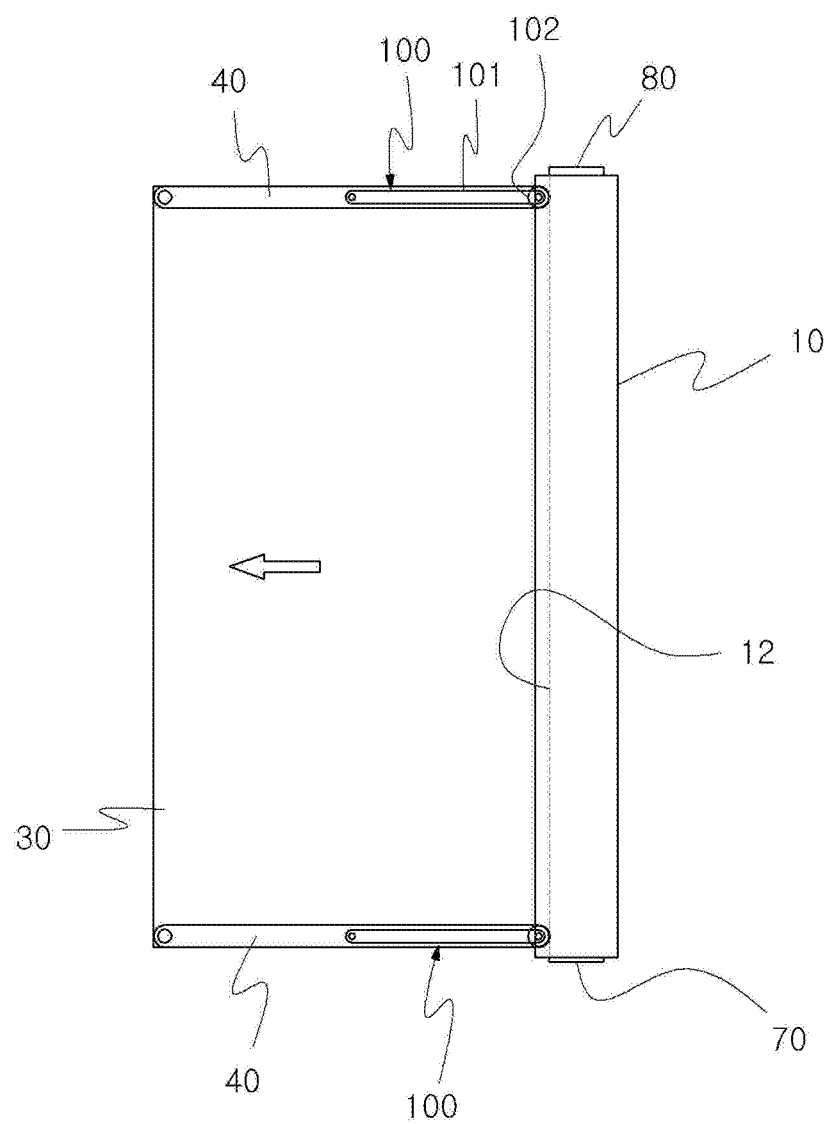
FIGS. 5 and 6 are reference views for describing an operation of a portable device including a flexible display panel according to an embodiment of the present invention.

Thus, as illustrated in FIG. 5, when the support 40 is rotated to be extended in a horizontal direction by the driving bar 101, the leading end portion of the display panel 30 is pulled to the outside by the support 40 and the display panel 30 is withdrawn from the case 10.

Figure 6:
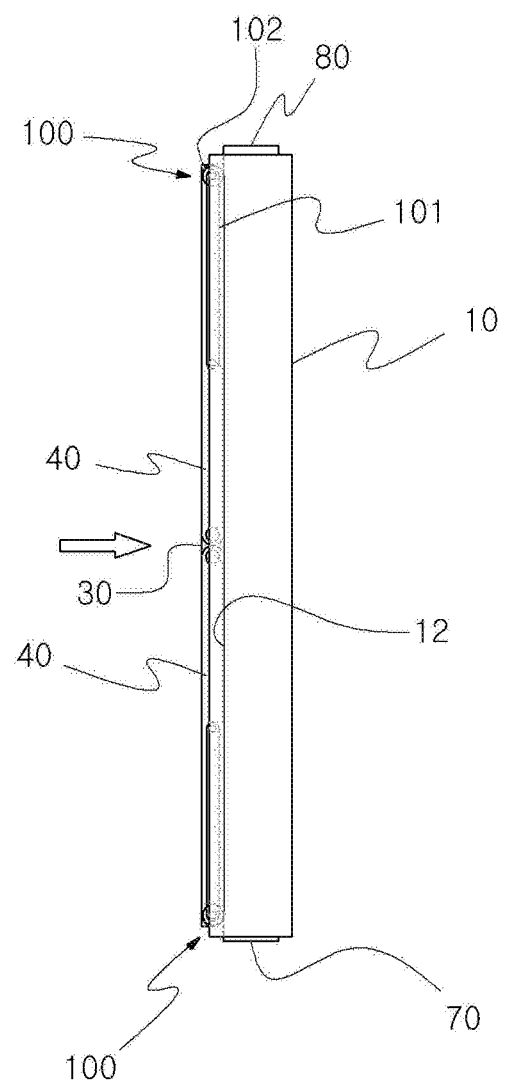
Figure 7:
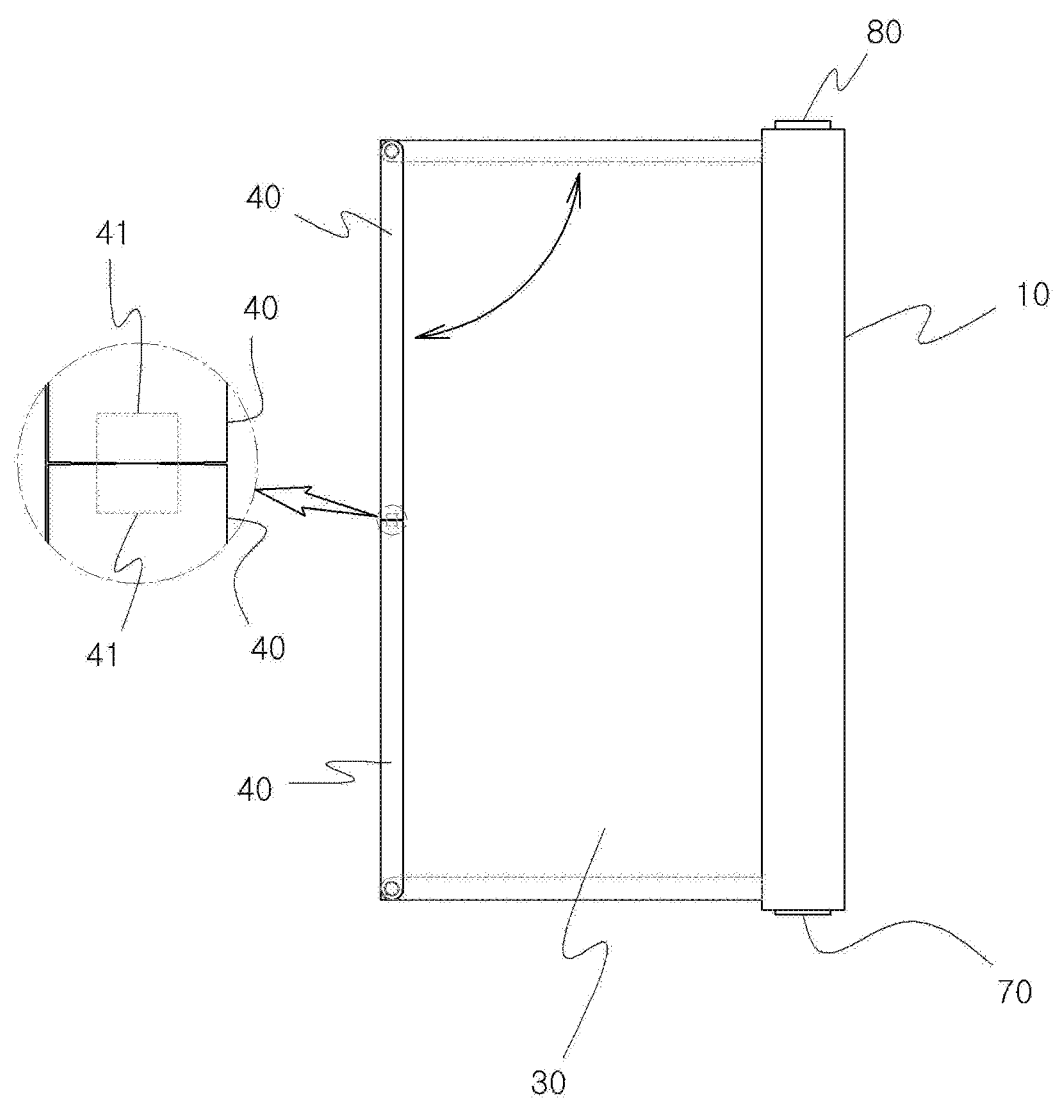
FIGS. 7 to 12 are reference views illustrating a modified example of a portable device including a flexible display panel according to an embodiment of the present invention.
Figure 8:
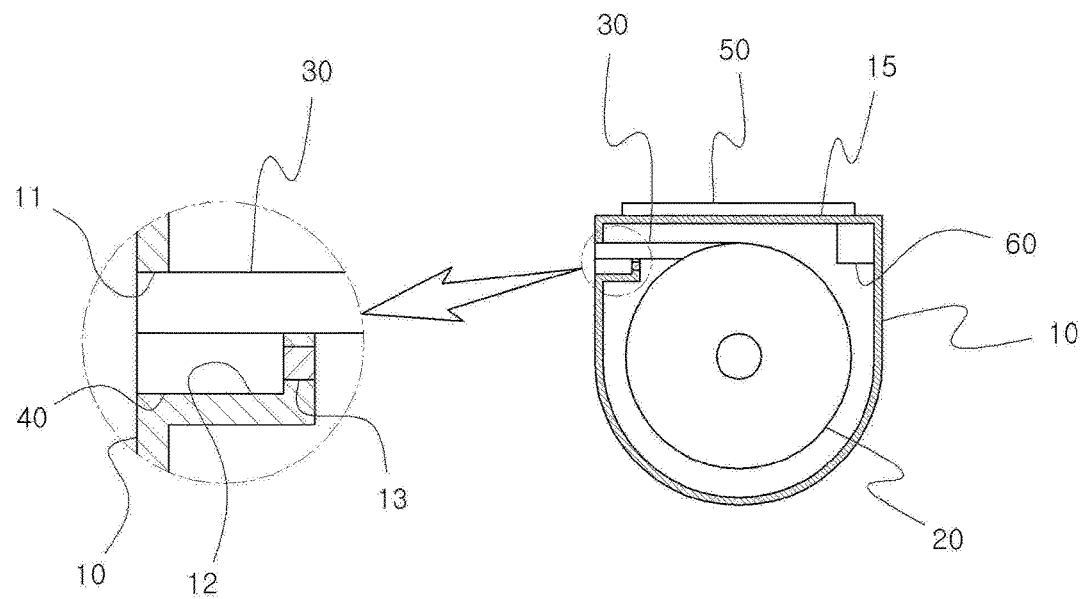

Conversely, as illustrated in FIG. 6, when the support 40 is rotated to be vertically extended by the driving bar 101, the winding drum 20 is rotated by the spring 21 to wind the display panel 30 so that the display panel 30 is accepted into the case 10.

Here, when the display panel 30 is inserted into the case 10, the support 40 and the driving bar 101 are inserted into the concave portion 12.

The auxiliary display panel 50 is provided in the planar portion 15 of the case 10 so that a telephone number is displayed when the communication unit 60 is called by a telephone, and is configured to display the time, the state of battery charging, or the like.

The communication unit 60 is the same as a communication unit provided in a general cellular phone or smart phone and a user can make a call using the communication unit 60.

To this end, a speaker and a microphone (not shown) are provided in the case 10.

The illumination lamp 70 is provided at a lower end portion of the case 10 and the call button 80 is provided at an upper end portion of the case 10.

Therefore, the call is received by the call button 80 when the communication unit 60 is called and when necessary, the illumination lamp 70 is used as a flashlight by illuminating the illumination lamp 70.

An undescribed reference numeral 90 illustrates a camera module provided at the planar portion 15 of the case 10.

In such a portable device including a flexible display panel, when the support 40 is rotated using the rotation driving unit 100, the display panel 30 is withdrawn from the case 10 or is accepted into the case 10.

Therefore, the flexible display panel 30 is easily accepted and withdrawn to be used, and since there is a feature that the flexible display panel 30 is wound in the form of rolled paper and may be maintained in a compact size when not used, there is an advantage capable of minimizing the overall size of the portable device.

Further, the planar portion 15 is formed on one side of the case 10. The auxiliary display panel 50 is provided in the planar portion 15 so that brief information may be displayed on the auxiliary display panel 50 for more convenient use in a state that the display panel 30 is accepted.

Further, the communication unit 60 is provided in the case 10, and the illumination lamp 70 and the call button 80 are provided at upper and lower end portions of the case 10 so that the portable device can be utilized for various applications such as a cellular phone or a flashlight.

In the embodiment, it is exemplified that the winding drum 20 is configured to rotate in a direction in which the display panel 30 is wound by the spring 21, but it is possible that a separate driving motor is connected to the winding drum 20, a control switch configured to control the driving motor is provided at the case 10 and a user uses the control switch to withdrawn or accept the display panel 30 from or into the case 10.

Further, in the portable device according to the present invention, it is exemplified that the support 40 is rotated using the rotation driving unit 100 so that the display panel 30 is accepted into the case 10 or withdrawn from the case 10, however, as illustrated in FIGS. 7 to 10, the portable device according to the present invention may be configured so that the user manually withdraws the display panel 30 outside without the rotation driving unit 100 and rotates the support 40 to fix the leading end portion of the support 40 to the concave portion 12 so that the display panel 30 is not accepted into the case 10.

Here, a magnet member 41 and a magnetic body 13 are provided in the leading end portion of the support 40 and the concave portion 12 so that the magnet member 41 and the magnetic body 13 may correspond to each other.

Figure 9:
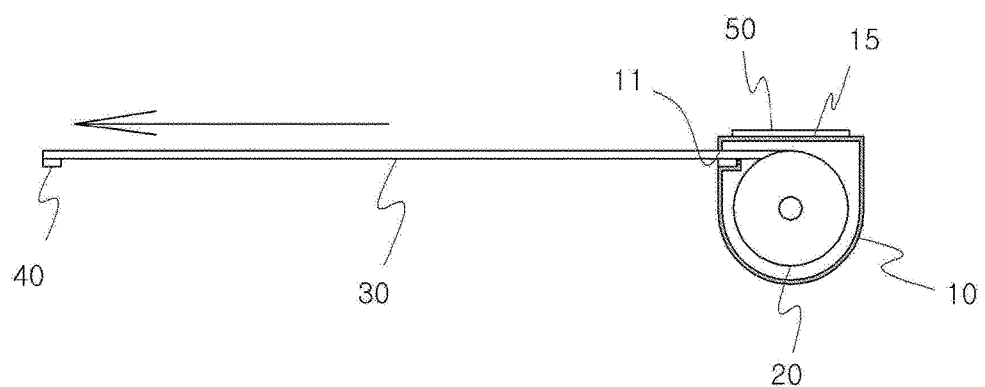
Figure 10:
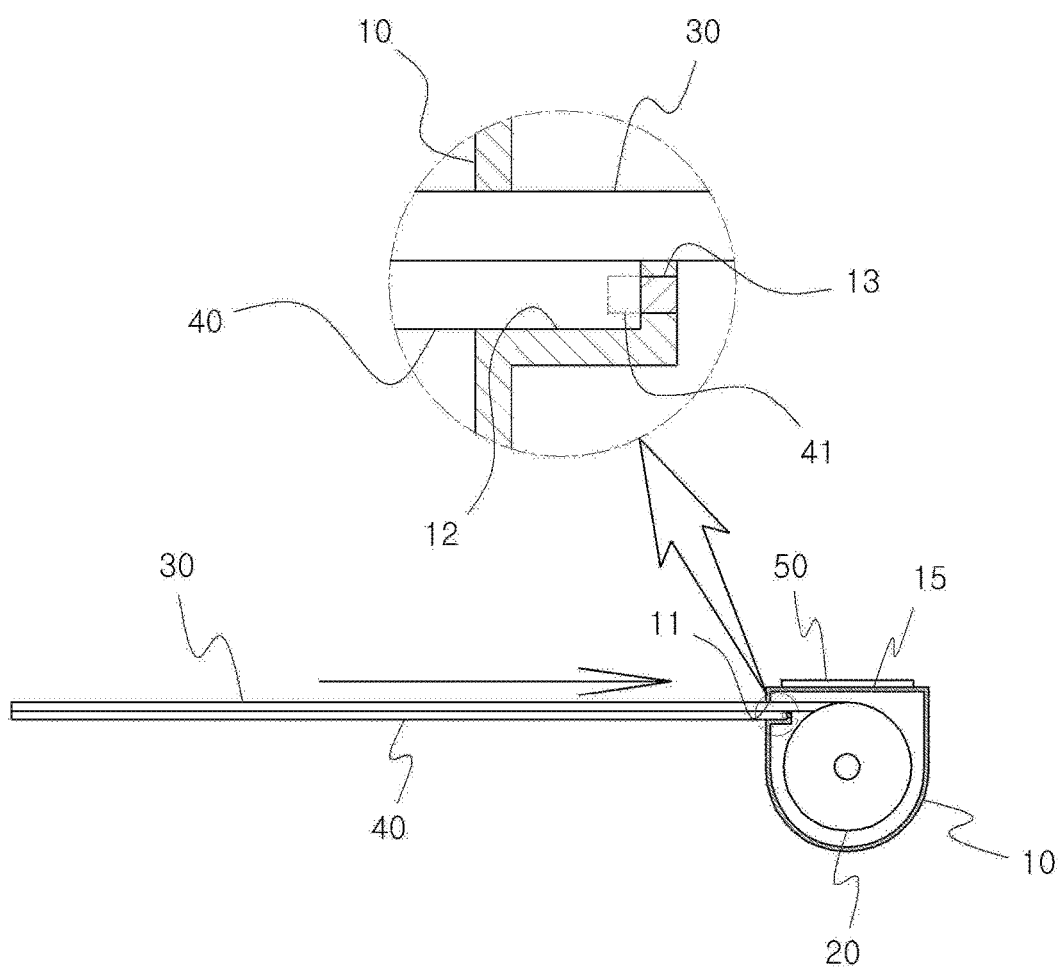

Thus, when the magnet member 41 and the magnetic body 13 are provided in the leading end portion of the support 40 and the concave portion 12 so that the magnet member 41 and the magnetic body 13 may correspond to each other, as illustrated in FIG. 9, in a state in which the display panel 30 is pulled outside, the leading end portion of the support 40 is inserted into the concave portion 12 by rotating the support 40 in a lateral direction and as illustrated in FIG. 10, thereby, the magnet member 41 and the magnetic body 13 are fixedly attached to each other such that the support 40 is not rotated.

Therefore, the support 40 is prevented from not securely supporting the display panel 30 when it is vertically rotated unintentionally in a state in which the display panel 30 is withdrawn from the case 10 and supported by the support 40.

Figure 11:
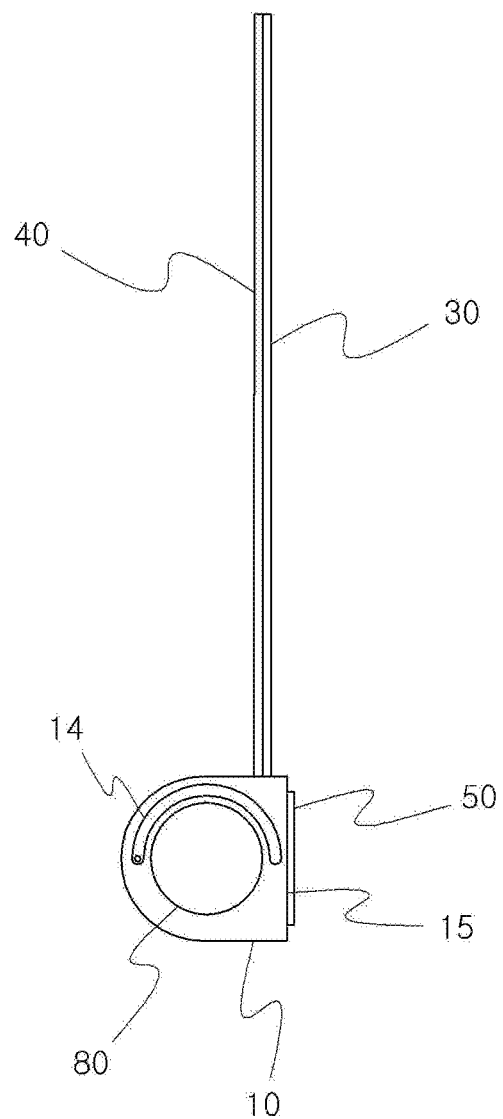
Figure 12:
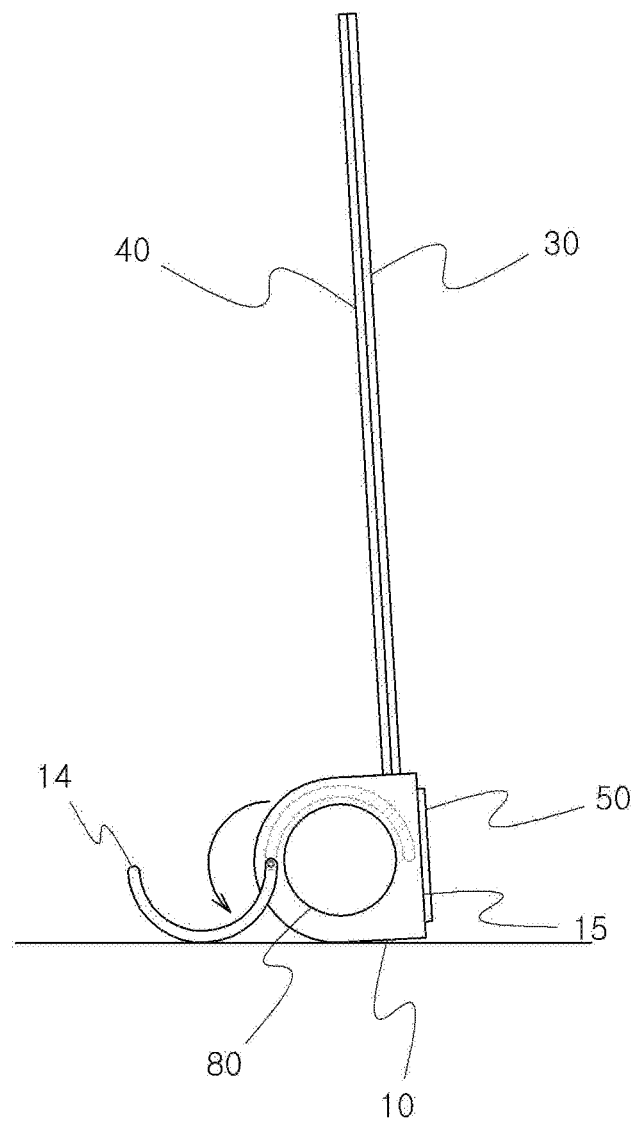

Further, as illustrated in FIGS. 11 and 12, a support member 14 is disposed on an upper end portion of the case 10 to surround the call button 80.

The support member 14 is configured to be in an arc shape having a greater diameter than the call button 80, and one end portion thereof is hinged with the case 10.

Therefore, as illustrated in FIG. 12, when the support member 14 is rotated to protrude outside the case 10 and the case 10 is placed on a floor, the case 10 is supported by the support member 14 so as not to topple in a state in which the display panel 30 is withdrawn and is supported by the support 40.

Since such a portable device including the flexible display panel is capable of not toppling using the support member 14 when placed on the floor, the portable device is conveniently used when a moving image is watched using the display panel 30.

In the portable device including a flexible display panel according to the present invention, the support 40 is rotated using the rotation driving unit 100 and then the display panel 30 is withdrawn from the case 10 or the display panel 30 is accepted into the case 10.

Therefore, the flexible display panel 30 is easily accepted and withdrawn to be used and since there is a feature that the flexible display panel 30 is wound in the form of rolled paper and can be maintained in a compact size when not used, there is an advantage capable of minimizing the overall size of the portable device.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A portable device including a flexible display panel, comprising:
    a case (10) configured to have a tubular shape vertically extending and having a slit (11) which vertically extends formed in one side of the case (10);
    a winding drum (20) rotatably provided inside the case (10);
    a display panel (30) configured to have a flexible sheet shape, wound around an outer circumferential surface of the winding drum (20) and configured to extend outside the case (10) through the slit (11);
    a support (40) provided on a rear surface of the display panel (30) and configured to support the display panel (30) extending outside the case (10); and
    a rotation driving unit (100) connected to the support (40) and configured to rotate the support (40),
    wherein a trailing end portion of the support (40) is rotatably coupled to a leading end portion of the display panel (30), and in a state in which the display panel (30) is unwound outside the case (10), the support (40) is laterally rotated so that a leading end portion of the support (40) is in close contact with an outer circumferential surface of the case (10) to support the display panel (30),
    wherein the rotation driving unit (100) includes:
    a driving bar (101) of which a trailing end portion is rotatably coupled to the case (10) and a leading end portion is hinged with a middle portion of the support (40); and
    a driving motor (102) connected to the trailing end portion of the driving bar (101) to rotatably reciprocate the driving bar (101),
    wherein the driving motor (102) rotates the driving bar (101) to be arranged in a direction perpendicular to a length direction of the case (10), and moves the support (40), which is connected to the driving bar (101), to be disposed on a peripheral region of the display panel (30) and in a direction which is perpendicular to the length direction of the case (10).

2. The portable device of claim 1, wherein a planar portion (15) is formed on one side of the case (10),
    further comprising an auxiliary display panel (50) provided on the planar portion (15).

3. The portable device of claim 1, further comprising:
    a communication unit (60) provided inside the case (10); and
    an illumination lamp (70) and a call button (80) respectively provided at upper and lower end portions of the case (10).

4. The portable device of claim 3, further comprising:
    a support member (14) disposed at an upper or lower end portion of the case (10) to surround the illumination lamp (70) or the call button (80),
    wherein one end portion of the support member (14) is hinged with the case (10), and in a state in which the display panel (30) is withdrawn from and supported by the support (40), when the support member (14) is rotated to protrude outside the case (10) and the case (10) is placed on a floor, the case (10) is supported by the support member (14).

5. The portable device of claim 1, wherein the driving motor (102) rotates the driving bar (101) and moves the support (40), such that the driving bar (101) is overlapped with the support (40) along an entire length of the driving bar (101).

\* \* \* \* \*